United States Patent [19]

Po' et al.

[11] Patent Number: 5,728,784
[45] Date of Patent: Mar. 17, 1998

[54] PROCESS FOR THE PREPARATION OF CRYSTALLINE VINYLAROMATIC POLYMERS WITH A PREDOMINANTLY SYNDIOTACTIC STRUCTURE

[75] Inventors: Riccardo Po', Leghorn; Nicoletta Cardi; Roberto Santi, both of Novara, all of Italy

[73] Assignee: Enichem S.p.A., Milan, Italy

[21] Appl. No.: 757,251

[22] Filed: Nov. 27, 1996

[30] Foreign Application Priority Data

Dec. 21, 1995 [IT] Italy .................. MI95A2701

[51] Int. Cl.$^6$ .................. C08F 4/646; C08F 12/04
[52] U.S. Cl. .................. 526/133; 526/134; 526/150; 526/160; 526/161; 526/165; 526/166; 526/347.2; 502/102; 502/103; 502/114; 502/117; 502/128; 502/131; 502/132; 502/153
[58] Field of Search .................. 526/133, 134, 526/150, 160, 161, 165, 166; 556/7, 52, 87; 502/131, 132, 153, 103, 114, 102, 117, 128

[56] References Cited

U.S. PATENT DOCUMENTS

| | | | |
|---|---|---|---|
| 5,128,295 | 7/1992 | Porri et al. | 526/150 X |
| 5,326,837 | 7/1994 | Kissin | 526/150 |
| 5,596,055 | 1/1997 | Aoyama et al. | 526/133 X |
| 5,629,391 | 5/1997 | Cardi et al. | 526/133 |
| 5,644,009 | 7/1997 | Tsai et al. | 526/133 X |

OTHER PUBLICATIONS

US Ser. No. 08/654,202 Filed May 28, 1996.
US Ser. No. 08/649,320 Filed May 17, 1996.
US Ser No. 08/716,882 Filed Sep. 20, 1996.

*Primary Examiner*—Fred Teskin
*Attorney, Agent, or Firm*—Watson Cole Stevens Davis, P.L.L.C.

[57] ABSTRACT

Process for the preparation of crystalline vinylaromatic polymers with a predominantly syndiotactic structure which comprises polymerizing vinylaromatic monomers, alone or mixed with at least one other monomer, in the presence of a catalytic system essentially consisting of:

a) a complex of titanium or zirconium selected from those having general formula:

$$MR_1R_2R_3R_4, A_1MR_1R_2R_3, A_1A_2MR_1R_2 \quad (I)$$

b) a co-catalyst selected from an alkylalumoxane and a compound of boron having formula (II):

$$BX_1X_2X_3 \quad (II)$$

or one of its salts;

c) a derivative of tin having general formula:

$$SnR_5R_6R_7R_8 \quad (III)$$

14 Claims, No Drawings

PROCESS FOR THE PREPARATION OF CRYSTALLINE VINYLAROMATIC POLYMERS WITH A PREDOMINANTLY SYNDIOTACTIC STRUCTURE

The present invention relates to a process for the preparation of vinylaromatic crystalline polymers with a predominantly syndiotactic structure.

More specifically, the present invention relates to a process for the preparation of crystalline polystyrene in which the polymeric chains have an essentially syndiotactic configuration and the catalyst suitable for the purpose.

Polystyrene is a thermoplastic polymer obtained by the radicalic polymerization of styrene and is used in the production of moulded articles, films, electric materials, materials for packaging, etc. It is an atactic, amorphous polymer, having excellent insulating properties and reasonable thermal resistance. For numerous applications it is preferable however to use crystalline materials with a high thermal resistance and resistance to solvents, characteristics which atactic polystyrene does not have.

European patent 210.615 describes a polystyrene having a structure characterized by an extremely high degree of stereoregularity, in which the phenyl substitutes are arranged to provide a syndiotactic polymer. This material does not have the above disadvantages of atactic polystyrene as it is crystalline and therefore, once transformed, can be subjected to orientation processes, it is almost completely insoluble in organic solvents and has a melting point within the range of 260°–280° C. and therefore has a high thermal resistance, comparable to or higher than that of condensation thermoplastic polymers (polyesters, polyamides, polyimides, etc).

Syndiotactic polystyrene can be prepared as described in literature, for example according to what is described in European patent EP 272.584 or U.S. Pat. No. 4,978,730, by polymerization catalyzed by compounds of Ti, Zr, in the presence of a cocatalyst represented by methylaluminoxane (a mixture of cyclic and linear oligomers containing the repetitive units —$AlCH_3O$—) or, as described in published European patent application 421.659, from derivatives of boron containing fluorinated groups.

Examples of catalysts for the synthesis of syndiotactic polystyrene mentioned in literature are titanium halides (chloride, bromide, etc.), titanium alcoholates (methoxide, ethoxide, propoxide, isopropoxide, butoxide etc.), titanium carboxylates, metallocenes (cyclopentadienyl titanium trichloride, cyclopentadienyl titanium dichloride, pentamethylcyclopentadienyl titanium trichloride, cyclopentadienyl titanium alkoxides, cyclopentadienyl titanium alkyls, pentamethylcyclopentadienyl titanium alkyls, dicyclopentadienyl titanium dichloride, dicyclopentadienyl titanium alkoxides, etc.), titanium alkyls (titanium tetrabenzyl, titanium tetramethyl, titanium tetraethyl, etc.) and the corresponding compounds of zirconium.

The Applicant has now found that it is possible to synthesize crystalline vinylaromatic polymers, and in particular crystalline polystyrene, having a predominantly syndiotactic configuration using a new catalytic system which has never been described in literature.

The present invention therefore relates to a process for the preparation of crystalline vinylaromatic polymers having a predominantly syndiotactic structure which comprises polymerizing vinylaromatic monomers, alone or mixed with at least another copolymerizable ethylenically unsaturated monomer, in the presence of a catalytic system essentially consisting of:

a) a complex of titanium or zirconium selected from those having general formula:

$$MR_1R_2R_3R_4, A_1MR_1R_2R_3, A_1A_2MR_1R_2 \qquad (I)$$

wherein the groups $R_1$, $R_2$, $R_3$ and $R_4$, the same or different, represent a $C_1$–$C_{10}$ (iso)alkyl, (iso)alkoxyl, alkylamidic radical, a $C_6$–$C_{10}$ aryl radical or a halogen such as chlorine whereas the $A_1$ and $A_2$ groups, the same or different, represent a cyclopentadienyl ligand, optionally substituted with $C_1$–$C_{10}$ alkyl radicals, or an indenyl ligand; M represents a titanium or zirconium atom;

b) a cocatalyst selected from an alkylalumoxane and a compound of boron having formula (II):

$$BX_1X_2X_3 \qquad (II)$$

or one of its salts, wherein $X_1$, $X_2$ and $X_3$, the same or different, represent a $C_1$–$C_{20}$ fluorinated hydrocarbon radical; and c) a derivative of tin having general formula:

$$SnR_5R_6R_7R_8 \qquad (III)$$

wherein the $R_5$, $R_6$, $R_7$ and $R_8$ groups, the same or different, represent a $C_1$–$C_{10}$ (iso)alkyl or aryl radical.

With respect to the traditional catalytic systems, essentially based on compounds (a) and (b), the catalytic system of the present invention causes increases in one or more of the following parameters:

activity of the catalytic system;

molecular weight of the syndiotactic polystyrene obtained;

degree of stereoregularity of the polymer.

The compounds having general formula (I) are products known in literature and described in the European patent 210.615 or in U.S. Pat. No. 4,978,730.

Typical examples of complexes of titanium or zirconium having formula (I), particularly suitable for the present invention are $TiCl_4$; $Ti(CH_2C_6H_5)_4$; $Ti(OCH_3)_4$; $Ti(OC_2H_5)_4$; $Ti(OC_3H_7)_4$; $Ti(Oi-C_3H_7)_4$; $Ti(OC_4H_9)_4$; $Ti[N(CH_3)_2]_4$; $Ti[N(C_2H_5)_2]_4$; $Ti[N(C_3H_7)_2]_4$; $Ti[N(i-C_3H_7)_2]_4$; $Ti[N(C_4H_9)_2]_4$; $CpTiCl_3$; $CpTi(OCH_3)_3$; $CpTi(OC_2H_5)_3$; $CpTi(OC_3H_7)_3$; $CpTi(Oi-C_3H_7)_3$; $CpTi(OC_4H_9)_3$; $CpTi[N(CH_3)_2]_3$; $CpTi[N(C_2H_5)_2]_3$; $CpTi[N(C_3H_7)_2]_3$; $CpTi[N(i-C_3H_7)_2]_3$; $CpTi[N(C_4H_9)_2]_3$; $Cp*TiCl_3$; $Cp*Ti(OCH_3)_3$; $Cp*Ti(OC_2H_5)_3$; $Cp*Ti(OC_3H_7)_3$; $Cp*Ti(Oi-C_3H_7)_3$; $Cp*Ti(OC_4H_9)_3$; $Cp*Ti[N(CH_3)_2]_3$; $Cp*Ti[N(C_2H_5)_2]_3$; $Cp*Ti[N(C_3H_7)_2]_3$; $Cp*Ti[N(i-C_3H_7)_2]_3$; $Cp*Ti[N(C_4H_9)_2]_3$; $InTiCl_3$; $InTi(OCH_3)_3$; $InTi(OC_2H_5)_3$; $InTi(OC_3H_7)_3$; $InTi(Oi-C_3H_7)_3$; $Inti(OC_4H_9)_3$; $InTi[N(CH_3)_2]_3$; $InTi[N(C_2H_5)_2]_3$; $InTi[N(C_3H_7)_2]_3$; $InTi[N(i-C_3H_7)_2]_3$; $InTi[N(C_4H_9)_2]_3$; etc. and the corresponding derivatives of Zirconium.

(Cp=cyclopentadienyl; In=indenyl; Cp*=pentamethyl cyclopentadienyl)

The compounds of titanium or zirconium having general formula (I) are added to the polymerization mixture in such a quantity that the molar ratio vinyl-aromatic monomer/M (M=titanium or zirconium) is between 1,000 and 200,000, preferably between 10,000 and 150,000.

The alkylalumoxane cocatalyst essentially consists of mixtures of products having a linear or cyclic or caged structure. In the first case the structure is represented by the general formula (IV):

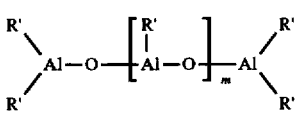

(IV)

whereas in the second case by the general formula (V):

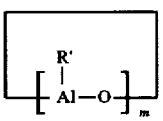

(V)

wherein m represents an integer between 1 and 40 and R' a $C_1-C_{20}$, preferably $C_1-C_8$, alkyl radical; a $C_6-C_{20}$, preferably $C_6-C_{12}$, aryl radical; a $C_7-C_{20}$, preferably $C_7-C_{12}$, aralkyl or alkylaryl radical; or a $C_3-C_{20}$, preferably $C_5-C_8$, cycloalkyl radical; or an O—R' radical wherein R' represents a $C_1-C_8$, preferably $C_1-C_4$, alkyl radical; a $C_6-C_{20}$, preferably $C_6-C_{12}$, aryl radical; or a halogen atom, such as chlorine, fluorine or bromine, provided not all the $R_1$ radicals are contemporaneously O—R' or halogens. The caged structure is described in Molecular Symposium, Vol. 97, 1995.

The above cocatalysts, having general formula (IV) and (V), are known in literature and described, for example, in published European patent applications 272.584 and 421.659 or in U.S. Pat. No. 4,978,730.

The cocatalyst having general formula (II), or its salt, is known in literature and is described in published European patent applications 421.659 and 482.934.

The preferred cocatalyst among those having general formulae (II), (IV) or (V) is methylalumoxane (MAO), a mixture of linear oligomers with m average of between 10 and 20 and cyclic oligomers with m average of between 10 and 20. The cocatalyst is generally used in such quantities that the molar ratio aluminium/M is between 50 and 2,000 or such that the molar ratio boron/M is between 0.5 and 10.

Preferred derivatives of tin of the present invention are $Sn(CH_3)_4$; $Sn(C_2H_5)_4$; $Sn(C_3H_7)_4$; $Sn(i-C_3H_7)_4$; $Sn(C_4H_9)_4$; $Sn(C_6H_5)_4$; $Sn(CH_2C_6H_5)_4$; etc. These compounds are added to the polymerization mixture in such a quantity that the molar ratio Sn/M is between 0.01 and 100, preferably between 0.1 and 50.

According to the process of the present invention, the catalytic system described above can also comprise, optionally, an aluminium alkyl wherein the alkyl group contains from 1 to 6 carbon atoms, for example aluminium trimethyl, aluminium triethyl, aluminium triisobutyl, etc., in such quantities that the molar ratio aluminium alkyl/M is between 0 and 800.

The term "vinylaromatic polymers" as used in the present description and in the claims essentially refers to polymers of styrene and derivatives of styrene and the relative copolymers containing up to 20% in moles of another copolymerizable monomer selected from those having general formula (V):

$$CH_2=CH—R''$$  (V)

wherein R" represents a hydrogen atom or a $C_1-C_6$ alkyl radical or a $C_4-C_{12}$ cycloalkyl radical.

Derivatives of styrene comprise alkyl styrenes, in which the alkyl group contains from 1 to 4 carbon atoms, halogenated styrenes, $C_1-C_4$ alkoxy styrenes, carboxy styrenes, vinylnaphthalenes, such as alpha- or beta-vinyl naphthalene, vinyl tetrahydro naphthalene such as 1,2,3,4-tetrahydro-6-vinyl naphthalene, etc. Typical examples of substituted styrenes are p-methylstyrene, m-methylstyrene, alone or mixed with each other, ethylstyrene, butylstyrene, p-terbutylstyrene, dimethylstyrene, chlorostyrene, bromostyrene, fluorostyrene, chloromethylstyrene, methoxystyrene, acetoxy methylstyrene, etc.

The polymerization reaction can be carried out in mass or in solvent. In the second case, the solvent can consist of aliphatic or aromatic hydrocarbons or their mixtures and is used in such quantities that the ratio by volume solvent/monomers is between 0 and 10. The preferred solvent is toluene.

More specifically, according to the general procedure adopted for this type of reaction, the vinylaromatic monomers are subjected to treatment, before polymerization, to eliminate catalytic poisons, such as phenol stabilizers, water, phenylacetylene, and consisting in distillation, passage over columns containing activated molecular sieves or activated alumina, etc. The monomers and, optionally, the solvent are charged into the reaction equipment together with the possible aluminium alkyl and cocatalyst. After a time varying from 5 seconds to 30 minutes, the catalytic system comprising the titanium complex having general formula (I) and the derivative of tin having general formula (III), is added, preferably in the form of a solution. The reaction proceeds for times varying from 15 minutes to 10 hours at temperatures of between 20° and 100° C. At the end, the polymer obtained is recovered using the traditional methods.

Some illustrative but not limiting examples are provided for a better understanding of the present invention and of its embodiment.

Analysis procedures:

The percentage of syndiotactic polymer is determined by extracting the polymer with acetone or methylethylketone (MEK) at boiling point for 10–20 hours.

The degree of stereoregularity is determined by nuclear magnetic resonance spectroscopy of carbon 13 as described in U.S. Pat. No. 4,680,353.

The molecular weights of the polymers obtained were determined by Gel Permeation Chromatography in trichlorobenzene at 135° C.

The percentages indicated in the examples are relative percentages.

Comparative Example 1

16 ml of styrene (0.140 moles) purified by passage on a basic alumina column, 2 ml of an 0.01M solution in toluene of tin tetramethyl ($2\times10^{-5}$ moles) and then 0.5 ml of an 0.01M solution in toluene of (pentamethylcyclopentadienyl) titanium trichloride ($5\times10^{-6}$ moles), were introduced into a tailed test-tube in an inert atmosphere.

The reaction was carried out for 2 hours at 60° C. At the end, the mixture was suspended in 200 ml of methanol containing 2 ml of concentrated HCl. No solid product was obtained.

Comparative Example 2

16 ml of styrene (0.140 moles) purified by passage on a basic alumina column, 0.75 ml of a 2M solution in toluene of aluminium triethyl ($1.5\times10^{-3}$ moles), 2 ml of an 0.01M solution in toluene of tin tetramethyl ($2\times10^{-5}$ moles) and then 0.5 ml of an 0.01M solution in toluene of (pentamethylcyclopentadienyl) titanium trichloride ($5\times10^{-6}$ moles), were introduced into a tailed test-tube in an inert atmosphere.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 126 mg (yield 0.9%) of atactic polystyrene were obtained.

Comparative Example 3

16 ml of styrene (0.140 moles) purified by passage on a basic alumina column, and 0.96 ml of a 1.57M solution in toluene of methylaluminoxane ($1.5\times10^{-3}$ moles) were introduced into a tailed test-tube in an inert atmosphere. After 5 minutes 0.5 ml of an 0.01M solution in toluene of tin tetramethyl ($5\times10^{-6}$ moles) were added.

The reaction was carried out for 5 hours at 60° C. At the end, the mixture was suspended in 200 ml of methanol containing 2 ml of concentrated HCl and filtered. The solid was again suspended in methanol, filtered and dried under vacuum. 711 mg (yield 4.9%) of atactic polystyrene were obtained.

Weight average molecular weight (Mw): 78,000;
Number average molecular weight (Mn): 14,000.

Comparative Example 4

20 ml of styrene (0.175 moles) purified by passage on a basic alumina column and 1.2 ml of a 1.57M solution in toluene of methylaluminoxane ($1.88\times10^{-3}$ moles) were introduced into a tailed test-tube in an inert atmosphere. After 5 minutes 0.5 ml of an 0.0125M solution in toluene of (pentamethylcyclopentadienyl)titanium trichloride ($6.25\times10^{-6}$ moles) were added.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 1.13 g (yield 6.2%) of polymer were obtained.

Fraction insoluble in metylethylketone (MEK): 77%. 13-C NMR analysis showed that the insoluble fraction had a percentage of syndiotactic dyads of 99.99%.

Weight average molecular weight (Mw): 300,000;
Number average molecular weight (Mn): 167,000.

Comparative Example 5

20 ml of styrene (0.175 moles) purified by passage on a basic alumina column and 1.2 ml of a 1.57M solution in toluene of methylaluminoxane ($1.88\times10^{-3}$ moles) were introduced into a tailed test-tube in an inert atmosphere. After 5 minutes 0.5 ml of an 0.0125M solution in toluene of titanium tetraethoxide ($6.25\times10^{-6}$ moles) were added.

The reaction was carried out for 5 hours at 60° C. At the end, the mixture was suspended in 200 ml of methanol containing 2 ml of concentrated HCl and filtered. The solid was again suspended in methanol, filtered and dried under vacuum. 1.38 g (yield 7.6%) of polymer were obtained.

Fraction insoluble in metylethylketone (MEK): 86%. 13-C NMR analysis showed that the insoluble fraction had a percentage of syndiotactic dyads of 99.5%.

Weight average molecular weight (Mw): 368,000;
Number average molecular weight (Mn): 164,000.

Comparative Example 6

20 ml of styrene (0.175 moles) purified by passage on a basic alumina column and 1.2 ml of a 1.57M solution in toluene of methylaluminoxane ($1.88\times10^{-3}$ moles) were introduced into a tailed test-tube in an inert atmosphere. After 5 minutes 2.2 ml of an 0.0285M solution in toluene of (indenyl)titanium trichloride ($6.25\times10^{-6}$ moles) were added.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 2.11 g (yield 11.6%) of polymer were obtained.

Fraction insoluble in metylethylketone (MEK): 86%. 13-C NMR analysis showed that the insoluble fraction had a percentage of syndiotactic dyads of 99.5%.

Weight average molecular weight (Mw): 250,000;
Number average molecular weight (Mn): 127,000.

Comparative Example 7

20 ml of styrene (0.175 moles) purified by passage on a basic alumina column and 1.2 ml of a 1.57M solution in toluene of methylaluminoxane ($1.88\times10^{-3}$ moles) were introduced into a tailed test-tube in an inert atmosphere. After 5 minutes 0.5 ml of an 0.0125M solution in toluene of (cyclopentadienyl) titanium trichloride ($6.25\times10^{-6}$ moles) were added.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 4.18 g (yield 31.6%) of polymer were obtained.

Fraction insoluble in metylethylketone (MEK): 89.3%. 13-C NMR analysis showed that the insoluble fraction had a percentage of syndiotactic dyads of 97.8%.

Weight average molecular weight (Mw): 93,000;
Number average molecular weight (Mn): 50,000.

Comparative Example 8

22.9 ml of styrene (0.2 moles) purified by passage on a basic alumina column and 0.4 ml of a 1.57M solution in toluene of methylaluminoxane ($6\times10^{-4}$ moles) were introduced into a tailed test-tube in an inert atmosphere. After 5 minutes 0.2 ml of an 0.01M solution in toluene of (cyclopentadienyl)titanium trichloride ($2\times10^{-6}$ moles) were added.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 4.55 g (yield 21.9%) of polymer were obtained.

Fraction insoluble in metylethylketone (MEK): 85%. 13-C NMR analysis showed that the insoluble fraction had a percentage of syndiotactic dyads of 98.5%.

Weight average molecular weight (Mw): 132,000;
Number average molecular weight (Mn): 47,000.

EXAMPLE 1

16 ml of styrene (0.14 moles) purified by passage on a basic alumina column, 0.96 ml of a 1.57M solution in toluene of MAO ($1.51\times10^{-3}$ moles), 0.5 ml of an 0.01M solution in toluene of tin tetramethyl ($5\times10^{-6}$ moles) and then 0.5 ml of an 0.01M solution in toluene of (pentamethylcyclopentadienyl)titanium trichloride ($5\times10^{-6}$ moles) were introduced into a tailed test-tube in an inert atmosphere.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 1.84 g (yield 12.7%) of polymer were obtained.

Fraction insoluble in metylethylketone (MEK): 65%. 13-C NMR analysis showed that the insoluble fraction had a percentage of syndiotactic dyads greater than 99.99%.

Weight average molecular weight (Mw): 505,000;
Number average molecular weight (Mn): 221,000.

EXAMPLE 2

16 ml of styrene (0.14 moles) purified by passage on a basic alumina column, 0.96 ml of a 1.57M solution in toluene of MAO ($1.5 \times 10^{-3}$ moles), 2 ml of an 0.01M solution in toluene of tin tetramethyl ($2 \times 10^{-5}$ moles) and then 0.5 ml of an 0.01M solution in toluene of (pentamethylcyclopentadienyl)titanium trichloride ($5 \times 10^{-6}$ moles) were introduced into a tailed test-tube in an inert atmosphere.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 2.5 g (yield 17.7%) of polymer were obtained.

Fraction insoluble in metylethylketone (MEK): 76%. 13-C NMR analysis showed that the insoluble fraction had a percentage of syndiotactic dyads greater than 99.99%.

Weight average molecular weight (Mw): 1,350,000;
Number average molecular weight (Mn): 300,000.

EXAMPLE 3

16 ml of styrene (0.14 moles) purified by passage on a basic alumina column, 0.96 ml of a 1.57M solution in toluene of MAO ($1.5 \times 10^{-3}$ moles), 2 ml of an 0.01M solution in toluene of tin tetraphenyl ($2 \times 10^{-5}$ moles) and then 0.5 ml of an 0.01M solution in toluene of (pentamethylcyclopentadienyl)titanium trichloride ($5 \times 10^{-6}$ moles) were introduced into a tailed test-tube in an inert atmosphere.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 2.13 g (yield 14.6%) of polymer were obtained.

Fraction insoluble in metylethylketone (MEK): 79%. 13-C NMR analysis showed that the insoluble fraction had a percentage of syndiotactic dyads greater than 99.99%.

Weight average molecular weight (Mw): 590,000;
Number average molecular weight (Mn): 257,000.

EXAMPLE 4

16 ml of styrene (0.14 moles) purified by passage on a basic alumina column, 0.48 ml of a 1.57M solution in toluene of MAO ($7.5 \times 10^{-4}$ moles), 2 ml of an 0.01M solution in toluene of tin tetraphenyl ($2 \times 10^{-5}$ moles) and then 0.5 ml of an 0.01M solution in toluene of (pentamethylcyclopentadienyl)titanium trichloride ($5 \times 10^{-6}$ moles) were introduced into a tailed test-tube in an inert atmosphere.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 1.39 g (yield 9.6%) of polymer were obtained.

Fraction insoluble in metylethylketone (MEK): 84%. 13-C NMR analysis showed that the insoluble fraction had a percentage of syndiotactic dyads greater than 99.99%.

Weight average molecular weight (Mw): 624,000;
Number average molecular weight (Mn): 300,000.

EXAMPLE 5

16 ml of styrene (0.14 moles) purified by passage on a basic alumina column, 0.96 ml of a 1.57M solution in toluene of MAO ($1.5 \times 10^{-3}$ moles), 0.5 ml of an 0.01M solution in toluene of tin tetramethyl ($5 \times 10^{-6}$ moles) and then 0.5 ml of an 0.01M solution in toluene of titanium tetraethoxide ($5 \times 10^{-6}$ moles) were introduced into a tailed test-tube in an inert atmosphere.

The reaction was carried out for 5 hours at 60° C. At the end, the mixture was suspended in 200 ml of methanol containing 2 ml of concentrated HCl and filtered. The solid was again suspended in methanol, filtered and dried under vacuum. 3.13 g (yield 21.5%) of polymer were obtained.

Fraction insoluble in metylethylketone (MEK): 79%. 13-C NMR analysis showed that the insoluble fraction had a percentage of syndiotactic dyads of 99.4%.

Weight average molecular weight (Mw): 352,000;
Number average molecular weight (Mn): 166,000.

EXAMPLE 6

16 ml of styrene (0.14 moles) purified by passage on a basic alumina column, 0.96 ml of a 1.57M solution in toluene of MAO ($1.5 \times 10^{-3}$ moles), 2 ml of an 0.01M solution in toluene of tin tetramethyl ($2 \times 10^{-5}$ moles) and then 0.5 ml of an 0.01M solution in toluene of titanium tetraethoxide ($5 \times 10^{-6}$ moles) were introduced into a tailed test-tube in an inert atmosphere.

The reaction was carried out for 5 hours at 60° C. At the end, the mixture was suspended in 200 ml of methanol containing 2 ml of concentrated HCl and filtered. The solid was again suspended in methanol, filtered and dried under vacuum. 2.04 g (yield 14%) of polymer were obtained.

Fraction insoluble in metylethylketone (MEK): 84%. 13-C NMR analysis showed that the insoluble fraction had a percentage of syndiotactic dyads of 99.6%.

Weight average molecular weight (Mw): 390,000;
Number average molecular weight (Mn): 190,000.

EXAMPLE 7

16 ml of styrene (0.14 moles) purified by passage on a basic alumina column, 0.96 ml of a 1.57M solution in toluene of MAO ($1.5 \times 10^{-3}$ moles), 2 ml of an 0.01M solution in toluene of tin tetraphenyl ($2 \times 10^{-5}$ moles) and then 0.5 ml of an 0.01M solution in toluene of titanium tetraethoxide ($5 \times 10^{-6}$ moles) were introduced into a tailed test-tube in an inert atmosphere.

The reaction was carried out for 5 hours at 60° C. At the end, the mixture was suspended in 200 ml of methanol containing 2 ml of concentrated HCl and filtered. The solid was again suspended in methanol, filtered and dried under vacuum. 1.8 g (yield 12.4%) of polymer were obtained.

Fraction insoluble in metylethylketone (MEK): 53%. 13-C NMR analysis showed that the insoluble fraction had a percentage of syndiotactic dyads of 99.5%.

Weight average molecular weight (Mw): 364,000;
Number average molecular weight (Mn): 186,000.

EXAMPLE 8

20 ml of styrene (0.175 moles) purified by passage on a basic alumina column, 1.2 ml of a 1.57M solution in toluene of MAO ($1.88 \times 10^{-3}$ moles), 2.35 ml of a 0.0013M toluene solution of tin tetramethyl ($3.12 \times 10^{-6}$ moles) and a 0.0027M of (indenyl)titanium trichloride ($6.25 \times 10^{-6}$ moles) were introduced into a tailed test-tube in an inert atmosphere.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 3.65 g (yield 20%) of polymer were obtained.

Fraction insoluble in metylethylketone (MEK): 94%. 13-C NMR analysis showed that the insoluble fraction had a percentage of syndiotactic dyads of 99.6%.

Weight average molecular weight (Mw): 233,000;
Number average molecular weight (Mn): 99,000.

EXAMPLE 9

16 ml of styrene (0.14 moles) purified by passage on a basic alumina column, 0.96 ml of a 1.57M solution in toluene of MAO ($1.5 \times 10^{-3}$ moles), 2 ml of an 0.01M solution in toluene of tin tetraphenyl ($2 \times 10^{-5}$ moles) and then 0.5 ml of an 0.01M solution in toluene of (cyclopentadienyl)titanium trichloride ($5 \times 10^{-6}$ moles) were introduced into a tailed test-tube in an inert atmosphere.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 6.13 g (yield 42.1%) of polymer were obtained.

Fraction insoluble in metylethylketone (MEK): 84%. 13-C NMR analysis showed that the insoluble fraction had a percentage of syndiotactic dyads of 98.1%.

Weight average molecular weight (Mw): 140,000;
Number average molecular weight (Mn): 52,000.

EXAMPLE 10

16 ml of styrene (0.14 moles) purified by passage on a basic alumina column, 0.96 ml of a 1.57M solution in toluene of MAO ($1.5 \times 10^{-3}$ moles), 0.5 ml of an 0.01M solution in toluene of tin tetramethyl ($5 \times 10^{-6}$ moles) and then 0.5 ml of an 0.01M solution in toluene of (cyclopentadienyl)titanium trichloride ($5 \times 10^{-6}$ moles) were introduced into a tailed test-tube in an inert atmosphere.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 3.16 g (yield 21.7%) of polymer were obtained.

Fraction insoluble in metylethylketone (MEK): 75%. 13-C NMR analysis showed that the insoluble fraction had a percentage of syndiotactic dyads of 98.2%.

Weight average molecular weight (Mw): 124,000;
Number average molecular weight (Mn): 63,000.

EXAMPLE 11

22.9 ml of styrene (0.2 moles) purified by passage on a basic alumina column, 0.2 ml of a 1.57M solution in toluene of MAO ($3 \times 10^{-4}$ moles), 2 ml of an 0.01M solution in toluene of tin tetraphenyl ($5 \times 10^{-5}$ moles) were introduced into a tailed test-tube in an inert atmosphere. After 5 minutes 0.2 ml of an 0.01M solution in toluene of (cyclopentadienyl) titanium trichloride ($2 \times 10^{-6}$ moles) were added.

The reaction was carried out for 2 hours at 60° C. At the end, the mixture was suspended in 200 ml of methanol containing 2 ml of concentrated HCl and filtered. The solid was again suspended in methanol, filtered and dried under vacuum. 4.33 g (yield 20.8%) of polymer were obtained.

Fraction insoluble in metylethylketone (MEK): 90%.
13-C NMR analysis showed that the insoluble fraction had a percentage of syndiotactic dyads of 98.3%.

Weight average molecular weight (Mw): 146,000;
Number average molecular weight (Mn): 86,000.

We claim:

1. A process for the preparation of crystalline vinylaromatic polymers with a predominantly syndiotactic structure which comprises polymerizing vinylaromatic monomers, alone or mixed with at least another copolymerizable ethylenically unsaturated monomer, in the presence of a catalytic system essentially consisting of:

a) a complex of titanium or zirconium selected from those having the formula:

$$MR_1R_2R_3R_4, \quad A_1MR_1R_2R_3, \quad A_1A_2MR_1R_2 \qquad (I)$$

wherein the groups $R_1$, $R_2$, $R_3$ and $R_4$, the same or different, represent a $C_1$–$C_{10}$ (iso)alkyl, (iso)alkoxyl, alkylamidic radical, a $C_6$–$C_{10}$ aryl radical or a halogen whereas the $A_1$ and $A_2$ groups, the same or different, represent a cyclopentadienyl ligand, optionally substituted with $C_1$–$C_{10}$ alkyl radicals, or an indenyl ligand; M represents a titanium or zirconium atom;

b) a cocatalyst selected from an alkylalumoxane and a compound of boron having the formula (II):

$$BX_1X_2X_3 \qquad (II)$$

or one of its salts, wherein $X_1$, $X_2$ and $X_3$, the same or different, represent a $C_1$–$C_{20}$ fluorinated hydrocarbon radical; and c) a derivative of tin having the formula:

$$SnR_5R_6R_7R_8 \qquad (III)$$

wherein the $R_5$, $R_6$, $R_7$ and $R_8$ groups, the same or different, represent a $C_1$–$C_{10}$ (iso)alkyl or aryl radical.

2. The process according to claim 1, wherein the molar ratio vinylaromatic monomer/M is between 1,000 and 200,000.

3. The process according to claim 1, wherein the cocatalyst is used in such quantities that the molar ratio aluminium/M is between 50 and 2000 or the molar ratio boron/M is between 0.5 and 10.

4. The process according to claim 1, wherein the derivative of tin is added to the polymerization mixture in such a quantity that the molar ratio Sn/M is between 0.01 and 100.

5. The process according to claim 1, wherein the above catalytic system comprises an aluminium alkyl wherein the alkyl group contains from 1 to 6 carbon atoms.

6. The process according to claim 5, wherein the molar ratio aluminium alkyl/M is between 0 and 800.

7. The process according to claim 1, wherein the polymerization reaction is carried out in mass or in solvent.

8. The process according to claim 7, wherein the solvent is used in such quantities that the ratio by volume solvent/monomers is between 0 and 10.

9. The process according to claim 1, wherein the polymerization is carried out at temperatures of between 20° and 100° C.

10. A process of claim 1 wherein the halogen is chlorine.

11. A method comprising contacting a catalytic composition comprising:

a) a complex of titanium or zirconium selected from those having the formula:

$$MR_1R_2R_3R_4, \quad A_1MR_1R_2R_3, \quad A_1A_2MR_1R_2 \qquad (I)$$

wherein the groups $R_1$, $R_2$, $R_3$ and $R_4$, the same or different, represent a $C_1$–$C_{10}$, (iso)alkyl, (iso)alkoxyl, alkylamidic radical, a $C_6$–$C_{10}$ aryl radical or a halogen whereas the $A_1$ and $A_2$ groups, the same or different, represent a cyclopentadienyl ligand, optionally substituted with $C_1$–$C_{10}$ alkyl radicals, or an indenyl ligand; M represents a titanium or zirconium atom;

b) a cocatalyst selected from an alkylalumoxane and a compound of boron having formula (II):

$$BX_1X_2X_3 \qquad (II)$$

or one of its salts, wherein $X_1$, $X_2$ and $X_3$, the same or different, represent a $C_1$–$C_{20}$ fluorinated hydrocarbon radical; and c) a derivative of tin having the formula:

$$SnR_5R_6R_7R_8 \qquad (III)$$

wherein the $R_5$, $R_6$, $R_7$ and $R_8$ groups, the same or different, represent a $C_1$–$C_{10}$, (iso)alkyl or aryl radical; with vinylaromatic monomers under reaction conditions to produce crystalline vinylaromatic polymers having a predominantly syndiotactic structure.

12. The method of claim 11 wherein the halogen is chlorine.

13. A catalytic composition comprising:

a) a complex of titanium or zirconium selected from those having the formula:

$$MR_1R_2R_3R_4, A_1MR_1R_2R_3, A_1A_2MR_1R_2 \qquad (I)$$

wherein the groups $R_1$, $R_2$, $R_3$ and $R_4$, the same or different, represent a $C_1$–$C_{10}$ (iso)alkyl, (iso)alkoxyl, alkylamidic radical, a $C_6$–$C_{10}$ aryl radical or a halogen whereas the $A_1$ and $A_2$ groups, the same or different, represent a cyclopentadienyl ligand, optionally substituted with $C_1$–$C_{10}$ alkyl radicals, or an indenyl ligand; M represents a titanium or zirconium atom;

b) a cocatalyst selected from an alkylalumoxane and a compound of boron having the formula (II):

$$BX_1X_2X_3 \qquad (II)$$

or one of its salts, wherein $X_1$, $X_2$ and $X_3$, the same or different, represent a $C_1$–$C_{20}$ fluorinated hydrocarbon radical; and c) a derivative of tin having the formula:

$$SnR_5R_6R_7R_8 \qquad (III)$$

wherein the $R_5$, $R_6$, $R_7$ and $R_8$ groups, the same or different, represent a $C_1$–$C_{10}$ (iso)alkyl or aryl radical.

14. The catalyst of claim 13 wherein the halogen is chlorine.

* * * * *